United States Patent
Li et al.

(10) Patent No.: US 7,545,537 B2
(45) Date of Patent: Jun. 9, 2009

(54) BANDLESS HALFTONE DESIGN FOR MULTIPLE BEAM PRINTERS EMPLOYING NON-ORTHOGONAL HALFTONES

(75) Inventors: Hong Li, Boulder, CO (US); Mikel John Stanich, Longmont, CO (US); Gerhard Robert Thompson, Wappingers Falls, NY (US); Chai Wah Wu, Poughquag, NY (US)

(73) Assignee: InfoPrint Solutions Company LLC, Boulder, CO (US)

(*) Notice: Subject to any disclaimer, the term of this patent is extended or adjusted under 35 U.S.C. 154(b) by 634 days.

(21) Appl. No.: 11/193,960

(22) Filed: Jul. 29, 2005

(65) Prior Publication Data

US 2007/0024911 A1    Feb. 1, 2007

(51) Int. Cl.
*G06K 15/00* (2006.01)
*H04N 1/405* (2006.01)

(52) U.S. Cl. .................. 358/3.06; 358/1.9; 358/3.2; 358/3.26; 358/533; 358/536

(58) Field of Classification Search .............. 358/1.9, 358/3.1, 3.13–3.2, 533–536; 382/254; 347/131
See application file for complete search history.

(56) References Cited

U.S. PATENT DOCUMENTS

| 4,084,183 A | | 4/1978 | Keller et al. |
| 4,543,613 A | | 9/1985 | Sakamoto |
| 5,627,919 A | * | 5/1997 | Kemmochi ............. 382/254 |
| 5,687,005 A | | 11/1997 | Fischer et al. |
| 6,985,256 B2 | * | 1/2006 | Cheng et al. ............. 358/1.9 |
| 7,123,383 B2 | * | 10/2006 | Hattori ................. 358/3.2 |
| 7,196,822 B2 | * | 3/2007 | Hu ..................... 358/3.16 |
| 7,286,267 B2 | * | 10/2007 | Chang .................. 358/3.1 |
| 7,405,743 B2 | * | 7/2008 | Toyama et al. ........... 347/131 |

(Continued)

FOREIGN PATENT DOCUMENTS

JP          01092772          4/1989

(Continued)

OTHER PUBLICATIONS

"PCT/EP2006/064651 International Search Report", (Nov. 6, 2006), 3 pages.

*Primary Examiner*—Edward L Coles
*Assistant Examiner*—Satwant K Singh
(74) *Attorney, Agent, or Firm*—Blakely, Sokoloff, Taylor & Zafman LLP

(57) ABSTRACT

A multiple beam printer system having N laser beams receives print job information from a print host. A rendering application uses a threshold array to generate halftone image data from the print job. The threshold array is defined based on a spot function. The defined screen is non-orthogonal and includes Y pels in a direction that is perpendicular to a scanning direction of the laser beams where Y is an integer multiple of N. A distance between screen dots in pels is preferably equal to an integer multiple of N. The screen dot may be defined by a supercell encompassing two screen dots and having an odd number of pels in a direction that is parallel to the scanning direction. The spot function may include a snap feature that snaps a screen dot to the nearest printer grid pel. The spot function may include scaling to compensate for the distortion of the non-orthogonal screen dot.

20 Claims, 9 Drawing Sheets

U.S. PATENT DOCUMENTS

| | | |
|---|---|---|
| 2002/0089708 A1 | 7/2002 | Cheng et al. |
| 2003/0035145 A1 | 2/2003 | Wang |
| 2003/0081256 A1 | 5/2003 | Wang et al. |
| 2003/0133161 A1 | 7/2003 | Harrington |
| 2004/0109184 A1 | 6/2004 | Ishii |
| 2004/0113921 A1 | 6/2004 | Hains et al. |

FOREIGN PATENT DOCUMENTS

| | | |
|---|---|---|
| JP | 2000037904 | 2/2000 |
| JP | 2001071560 | 3/2001 |
| JP | 2001341356 | 12/2001 |
| WO | WO 0056062 A1 | 9/2000 |

* cited by examiner

| HSIDE | VSIDE | ANGLE1 | ANGLE2 | RES1 | RES2 | SCREEN FREQUENCY CANDIDATE |
|---|---|---|---|---|---|---|
| 6 | 10 | 59.0 | 121.0 | 116.6 | 116.6 | 141 |
| 7 | 10 | 55.0 | 125.0 | 104.6 | 104.6 | 106 |
| 8 | 10 | 51.3 | 128.7 | 96.0 | 96.0 | 106 |
| 10 | 10 | 45.0 | 135.0 | 84.9 | 84.9 | 85 |
| 14 | 10 | 35.5 | 144.5 | 73.7 | 73.7 | 71 |

400

| 22 | 90 | 214 | 255 | 234 | 125 | 28 | 22 | 90 | 214 |
|----|----|-----|-----|-----|-----|----|----|----|-----|
| 56 | 77 | 186 | 228 | 200 | 152 | 83 | 56 | 77 | 186 |
| 111 | 97 | 118 | 145 | 173 | 166 | 138 | 111 | 97 | 118 |
| 207 | 125 | 63 | 49 | 109 | 200 | 221 | 207 | 125 | 63 |
| 234 | 152 | 42 | 8 | 77 | 186 | 255 | 234 | 152 | 42 |
| 248 | 179 | 70 | 1 | 49 | 159 | 241 | 248 | 179 | 70 |
| 228 | 193 | 97 | 42 | 56 | 181 | 214 | 228 | 193 | 97 |
| 155 | 173 | 186 | 138 | 111 | 104 | 118 | 155 | 173 | 186 |
| 90 | 159 | 193 | 221 | 179 | 70 | 63 | 90 | 159 | 193 |
| 35 | 131 | 241 | 248 | 207 | 83 | 15 | 35 | 131 | 241 |
| 22 | 90 | 214 | 255 | 234 | 125 | 28 | | | |
| 56 | 77 | 186 | 228 | 200 | 152 | 83 | | | |
| 111 | 97 | 118 | 145 | 173 | 166 | 138 | | | |
| 207 | 125 | 63 | 49 | 109 | 200 | 221 | | | |
| 234 | 152 | 42 | 8 | 77 | 186 | 255 | | | |

FIG. 6

| 35 | 97 | 207 | 248 | 214 | 125 | 42 | 35 | 97 | 207 |
|---|---|---|---|---|---|---|---|---|---|
| 70 | 104 | 159 | 179 | 193 | 166 | 83 | 70 | 104 | 159 |
| 145 | 111 | 70 | 83 | 155 | 2 | 173 | 145 | 111 | 70 |
| 200 | 97 | 49 | 28 | 56 | 221 | 241 | 200 | 97 | 49 |
| 228 | 118 | 42 | 1 | 125 | 234 | 255 | 228 | 118 | 42 |
| 214 | 111 | 56 | 22 | 104 | 207 | 248 | 214 | 111 | 56 |
| 193 | 159 | 125 | 77 | 62 | 132 | 179 | 193 | 159 | 125 |
| 138 | 166 | 186 | 173 | 152 | 77 | 90 | 138 | 166 | 186 |
| 63 | 131 | 221 | 241 | 200 | 90 | 49 | 63 | 131 | 221 |
| 15 | 118 | 234 | 255 | 228 | 111 | 8 | 15 | 118 | 234 |
| 35 | 97 | 207 | 248 | 214 | 125 | 42 | | | |
| 70 | 104 | 159 | 179 | 193 | 166 | 83 | | | |
| 145 | 111 | 70 | 83 | 155 | 2 | 173 | | | |
| 200 | 97 | 49 | 28 | 56 | 221 | 241 | | | |
| 228 | 118 | 42 | 1 | 125 | 234 | 255 | | | |

BANDLESS HALFTONE DESIGN FOR MULTIPLE BEAM PRINTERS EMPLOYING NON-ORTHOGONAL HALFTONES

BACKGROUND

1. Field of the Present Invention

The present invention is in the field of printer systems and more particularly, printer systems employing multiple beams.

2. History of Related Art

A halftone image is a reproduction of a contone image (e.g., a photograph), using spots of varying size to produce apparent shades of gray. The darker the shade at a particular point in the image, the larger the corresponding spot in the halftone. In traditional publishing, halftones are created by photographing an image through a screen. In desktop publishing, each halftone spot is created by a collection of darkened pixels printed by a laser printer or digital image setter. In the case where the halftone spots form a regular grid the frequency of the halftone dots is measured in lines per inch. Higher printer resolution enables effective use of higher density of halftone dots, enhancing image quality.

An image typically is an array of values created by scanning a continuous tone original such as a photograph. The scan results in light striking a photosensitive device that produces an electrical signal having a value determined by the characteristics of the reflected light. The value produced by the photosensitive device is converted to a digital value that represents the tonality of the original image. The photosensitive device produces an array of such values. This array of values is sometimes referred to as the original image.

One common method of creating a halftone image is achieved by using an array of digital values, typically ranging from 0 to 255, referred to as a threshold array. The threshold array represents one or more halftone cells. First, the threshold array is tiled across the original image, with or without an offset between adjacent rows of the tiles. The gray levels of the original image are then compared with the values of the corresponding tiled array positions and blackened if they are lower, or left unprinted if they are higher. In this way the original image is converted into an image with halftone "dots". The blackened picture elements (pels) can then be printed using a binary printer. Other methods also exist to create halftones such as algorithmic error diffusion or direct binary search methods. The threshold array method is one of the most common because it requires minimal computational processing.

Thus, the halftone dots are formed by thresholding the values of the original image with the tiled threshold array. The threshold array itself may be generated by a spot function based on a mathematical algorithm. The spot function determines a dot's shape as it grows in size from nonexistence (white) to solid (black). A variety of spot functions exist, including round, elliptical and diamond. Straight-line and star-shaped spot functions are also possible, as are numerous other variations.

A multiple beam printer, as suggested by its name, is characterized by a raster having two or more laser beams operating simultaneously. Multiple beam printers often produce halftone images exhibiting banding. Banding is also frequently referred to as moire banding. Banding is an undesirable periodic artifact which the human eye detects and which is well known in the field of printing systems. Banding in multiple beam printers is affected by differences in the power of individual laser beams, scan direction beam offsets, and spot spacing errors. Unfortunately, the spatial frequency for banding is often near the most sensitive region of human perception and, accordingly, very small errors of any of these parameters can result in easily detectable banding. It is desirable to implement a multiple beam printing system that minimizes banding effects.

SUMMARY OF THE INVENTION

The identified object is achieved by a printer system that includes a controller to receive print job information from a print host and a rendering application to generate halftone image data from the print job. Imaging hardware, including multiple laser beams, is configured to print N lines of a document simultaneously as in a raster. A laser source is described, however other light sources, such as light Emitting Diodes, can be used to create multiple light sources imaging N lines of a document simutaneously. The rendering application uses a threshold array based on a defined screen dot to generate the halftone image data. The defined screen dot may be orthogonal or non-orthogonal and includes Y pels in a direction that is perpendicular to a raster direction of the laser beams where Y is an integer multiple of N. The distance between adjacent screen dots in pels may be equal to N or a multiple of N. Depending on the screen parameters, in a preferred embodiment the threshold array is composed of supercell tiling of a basic supercell encompassing two screen dots and having an odd number of pels in a direction that is parallel to the raster direction. In an alternative embodiment, the basic cell consists of a single screen dot. The screen dot may be defined with the use of a spot function halftone. In cases where the basic cell encompasses multiple screen dots, the spot function includes a snap feature that snaps a screen dot to the nearest printer grid pel. The spot function may be scaled linearly in one direction by the non-orthogonal screen dot. The direction of linear scaling in the spot function is preferably the direction of greater ellipticity as that could provide continuity between adjacent dots. Alternatively, the spot function may also be spatially scaled with a factor that depends on its distance to the center of the cell. This results in more scaling near the center of the cell to compensate for the distortion brought on by the non-orthogonality of the screen dot, with the scaling continuously reducing to no scaling at the boundary of the screen cell, thus insuring continuity between adjacent dots.

BRIEF DESCRIPTION OF THE DRAWINGS

Other objects and advantages of the invention will become apparent upon reading the following detailed description and upon reference to the accompanying drawings in which:

FIG. 6 illustrates screen dot growth for implementations of screen dots with an odd number of pixels on one axis and no snap function;

FIG. 7 illustrates screen dot growth for implementations of screen dots with an odd number of pixels on one axis;

Figure 1:
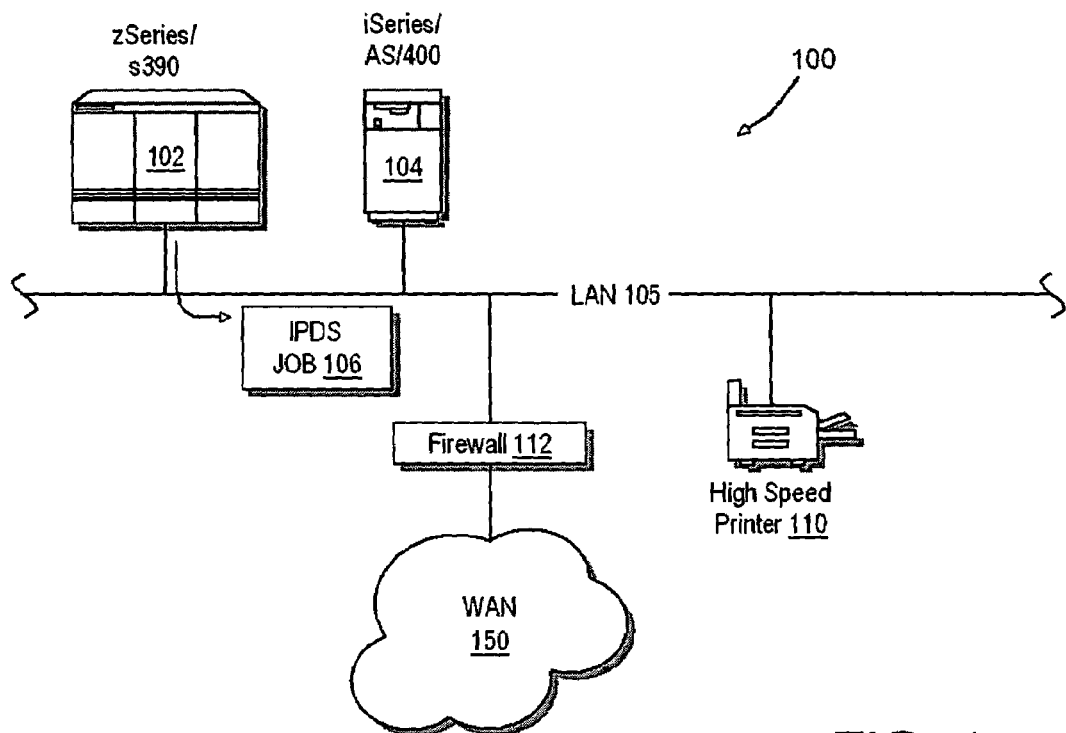
FIG. 1 is a block diagram of a networked printer system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the invention is directed towards a multiple beam printer system that produces substantially bandless halftone images. The printer system employs N laser beams and uses an X x Y halftone supercell design where X is the number of pels in the horizontal direction (HSIDE) and Y is the number of pels in the vertical direction (VSIDE). Preferably, Y is an integer multiple of N such that the distance between halftone screen dots is equal to an integer multiple of the total distance between all the beams of the multiple beam raster. Embodiments of the invention may employ a non-orthogonal screen dot supercell where the supercell defines two or more screen dots. The supercell may have an odd number of pels in either the horizontal or vertical direction. For supercells with an odd number of HSIDE or VSIDE pels, the invention preferably uses a spot function and an associated snap that function causes each screen dot in the supercell to grow consistently from all white (clear) to all black.

Referring now to the drawings, FIG. 1 is a simplified block diagram of a data processing network 100 that includes a high-speed printer 110 according to one embodiment of the invention. In the depicted embodiment, high-speed printer 110 is connected to a LAN 105. LAN 105 is preferably an Ethernet or other form of LAN on which a networking protocol such as TCP/IP may be implemented. LAN 105, as shown in FIG. 1 is connected to a wide area network (WAN) 150, such as the Internet, through a firewall 112.

Various data processing systems are connected to LAN 105 and have network access to high-speed printer 110 as a resource. In the depicted embodiment, the data processing systems include a first system 102 representing a mainframe system such as an S/390 enterprise server and a midrange server 104 such as an AS/400e server, both from IBM Corporation. In the depicted implementation, first system 102 and second system 104 have access to high-speed printer 110. High-speed printer 110 may include elements found in a midrange, cutsheet production printer.

As depicted in FIG. 1 data processing systems 102 and 104 send print jobs to high-speed printer 110 over LAN 105. FIG. 1, for example, depicts first data processing system 102 sending a print job to high-speed printer 110 over LAN 105. The print job, indicated by reference numeral 106, may be an IPDS (Intelligent Printer Data Stream) compliant printer job. IPDS provides an interface for identifying, monitoring, and controlling all-points-addressable (APA) printers such as high-speed printer 110. IPDS facilitates the presentation of pages with combinations of various data types including text, vector graphics, images, and bar codes as well as the merging of different data types, often produced by independent applications, at print time.

Figure 2:
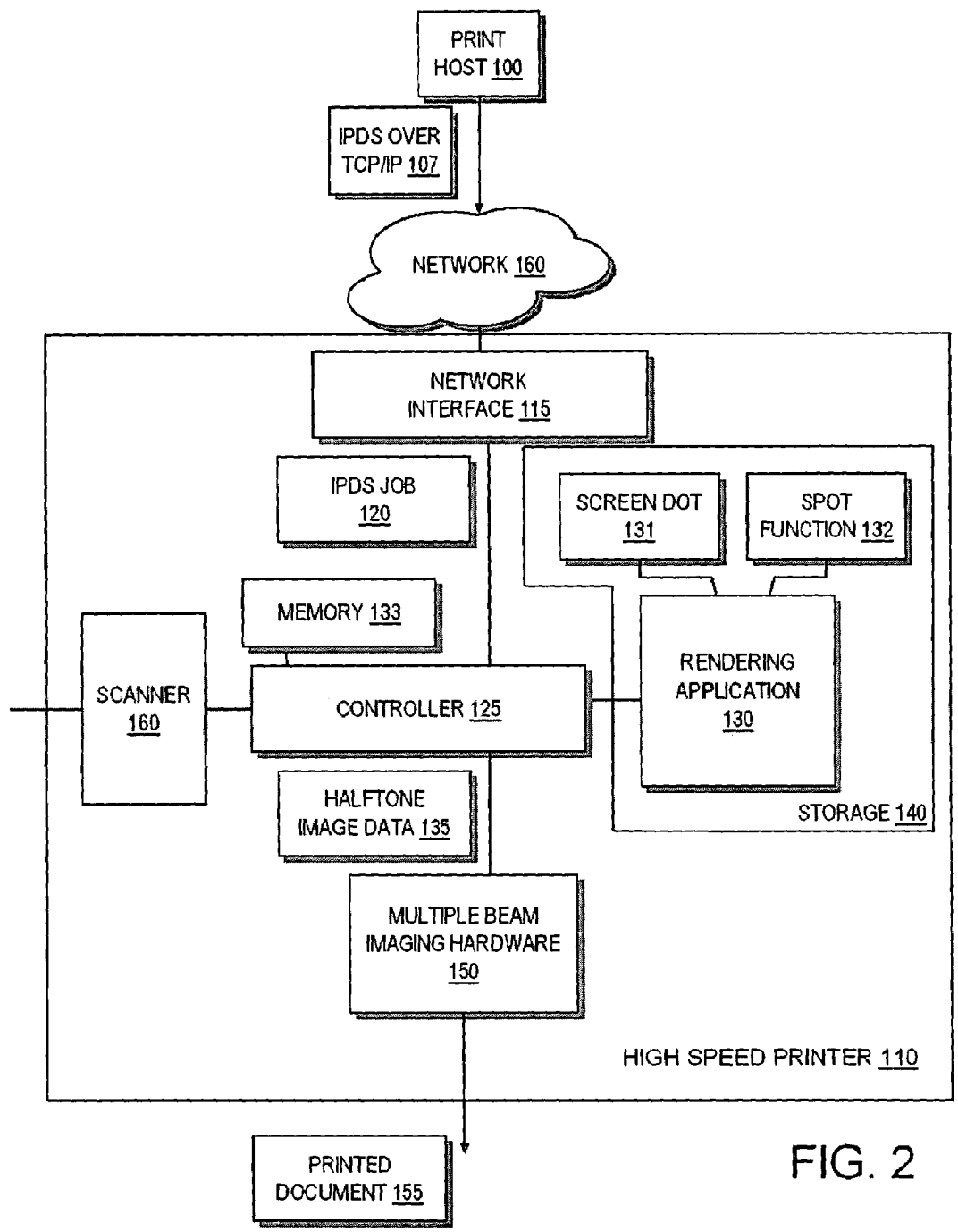
FIG. 2 is a block diagram of selected element of the printer system of FIG. 1.

IPDS also supports two-way printer communication that enables detailed exception reporting and allows IPDS to adapt to specific printer resources and to deal with errors in real time. Other Page Description Languages can also be employed by the system. Referring now to FIG. 2, selected elements of high-speed printer 110 according to one embodiment of the present invention are illustrated. In the depicted implementation, high-speed printer 110 includes a network interface 115 that couples the printer to a network 160, which may include both the LAN 105 and the WAN 150 of FIG. 1. In addition, FIG. 2 represents any print host data processing system (such as systems 102 or 104 of FIG. 1) generically as IPDS print host 101.

Network interface 115 includes the hardware, software, and firmware required to convert data such as an IPDS file into a network compliant packet or stream of packets. In the case of an Ethernet LAN, for example, network interface 115 includes a TCP/IP protocol processing stack that converts TCP/IP compliant packets on network 160 into application specific data that can be executed or interpreted by a controller 125 of printer 110. Likewise, network interface 115 converts data produced by controller 125 into network compliant packets for transmission over network 160.

The IPDS job 106 (FIG. 1) produced by data processing system 102 is sent over LAN 105 to high-speed printer 110 using conventional TCP/IP network addressing, transmission, and connection techniques. The IPDS job 106 of FIG. 1 is shown in FIG. 2 as IPDS over TCP/IP job 107 to emphasize the presence of network protocol layer data in job 107.

As depicted in FIG. 2, the IPDS over TCP/IP job 107 is received and processed by network interface 115 of high-speed printer 110. The network processing removes the network protocol layers (sometimes referred to as headers) of the IPDS job to produce an internal IPDS job 120. As such, the internal IPDS job 120 preferably consists of IPDS commands only and does not contain any network protocol layering. Controller 125 may be implemented as a general-purpose microprocessor such as a PowerPC® family processor from IBM Corporation. In other embodiments, controller 125 may be implemented as a special purpose or embedded controller. High speed printer 110 further includes memory 133, which may be implemented with conventional volatile memory devices such as DIMM's or SIMM's, that is accessible to controller 125. In addition, controller 125 has access to persistent or non-volatile storage 140, such as a hard disk and/or a flash memory device. Some embodiments of the invention may be implemented as computer executable instructions (e.g., the rendering application 130 described below) and computer readable data (the screen dot 131 described below) for generating substantially bandless halftone image data. In these embodiments, the instructions are stored on or otherwise embedded in a computer readable storage medium such as storage 140 or another suitable storage medium (e.g., optical disk, flash memory device, electrically erasable ROM (read only memory), and the like.

In the depicted embodiment, a rendering application 130, according to an embodiment of the present invention, is stored in storage 140. Rendering application 130 is responsible for converting the information and commands in IPDS job 120 into raster data referred to as halftone image data 135 that can be used by the system's imaging hardware 150. The rendering application could also be a Postscript or PCL interpreter. In the depicted embodiment, rendering application 130 uses a threshold array to generate halftone image data 135 according to the present invention. Imaging hardware 150 is preferably implemented with multiple laser beams that provide multiple, simultaneous laser writes during rendering of an image. The number of beams (N) in imaging hardware 150 is an implementation detail. In one embodiment, high speed printer 110 uses five bean imaging hardware. Imaging hardware 150 uses the halftone image data 135 produced by controller 125 to produce a printed document 155. High speed printer 110 may also include a scanner 160 for creating print images directly from a hard copy source.

Figures 3, 4:
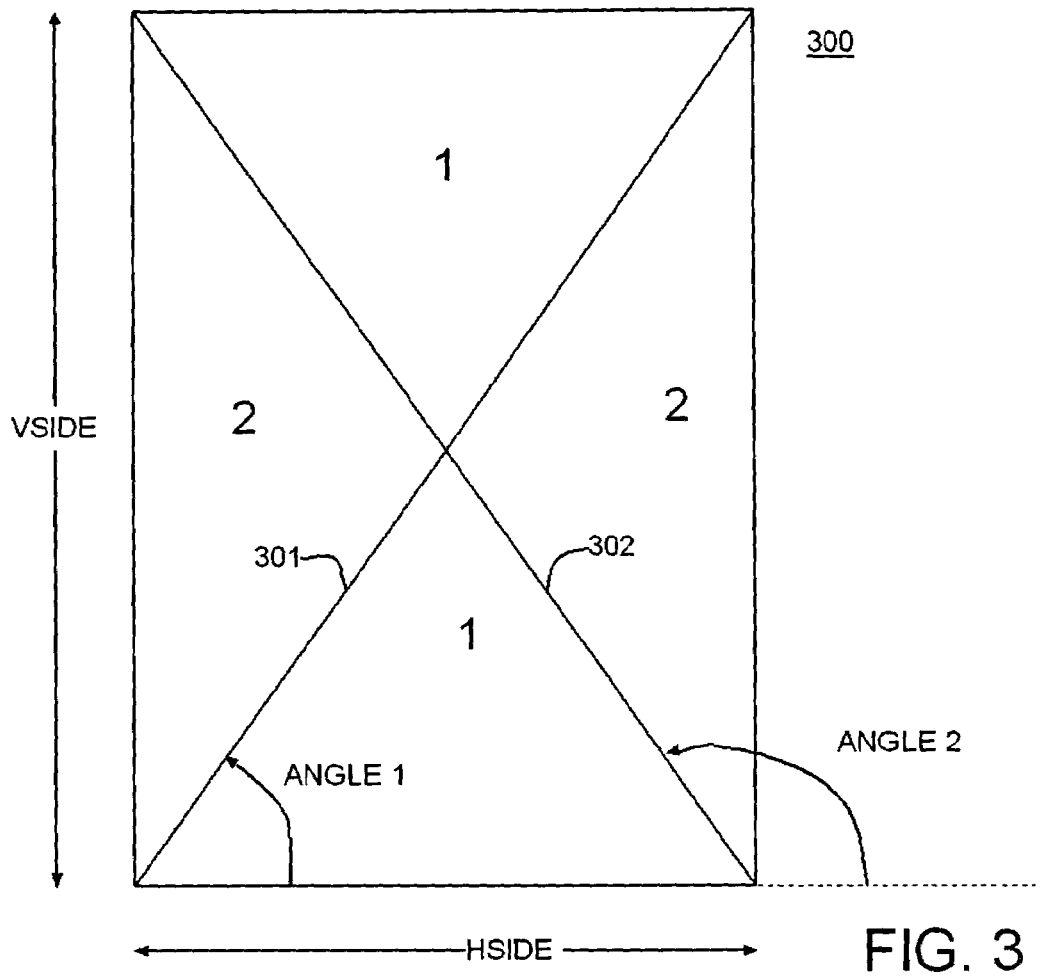
FIG. 3 illustrates a non-orthogonal supercell according to the present invention.
FIG. 4 is a table illustrating various table and sewing combinations.

The present invention uses non-orthogonal halftone designs to minimize or reduce banding artifacts in printed document 155. Referring to FIG. 3, a supercell 300 according to one embodiment of invention is depicted. Supercell 300 is suitable for use as screen dot 131 of FIG. 2 to enable rendering application 130 to generate halftone image data 135.

In the depicted embodiment, screen dot supercell 300 defines two screen dots identified by numbers 1 and 2. Although screen dots 1 and 2 are both discontinuous as depicted in FIG. 3, one skilled in the field can appreciate that, by tiling supercell 300 without spacing between adjacent supercells and without offset for adjacent rows of the supercell, supercell 300 will produce an array of continuous, equally sized and shaped screen dots.

Supercell 300 is characterized by four parameters, namely, the HSIDE and VSIDE parameters and the angle 1 and angle 2 parameters (which can be derived from HSIDE and VSIDE). HSIDE represents the number of pels in the horizontal direction while VSIDE represents the number of pels in a vertical direction of supercell 300. Angle 1 is defined by a first diagonal 301 diagonals in supercell 300 while angle 2 is defined by a second diagonal 302.

In the non-orthogonal screen cell, angle 1 and angle 2 differ by an amount that is not equal to 90° (i.e., first diagonal 301 and second diagonal 303 are not perpendicular to one another). This condition holds true for rectangular supercells (i.e., HSIDE≠VSIDE).

FIG. 4 presents a table 400 indicating various possible configurations of the supercell 300. Table 400 indicates the values of HSIDE, VSIDE, angle 1, and angle 2. In addition, table 400 indicates a suitable candidate for the screen frequency based on the supercell parameters. Table 400 conveys the flexibility of the non-orthogonal screen dot design of the present invention. More specifically, table 400 illustrates the supercell parameters for a total of five candidate supercell designs, each of which has 10 pels in the vertical (VSIDE) direction and a variable number of pels in the horizontal (HSIDE) direction. In addition to illustrating the HSIDE, VSIDE, Angle 1, and angle 2 parameters, table 400 also discloses suitable screen frequencies (lines per inch) for each of the disclosed configurations.

The 10 pels in each of the disclosed configurations of screen dots is significant in the context of the multiple beam printer of the present invention. Specifically, one embodiment of the invention uses a VSIDE value that is an integer multiple of the number of laser beams in the printer system. Thus, for a 5-beam printer system, appropriate VSIDE values include 5, 10, 15, etc. This configuration assumes that the path or direction of the multiple beams as they write is perpendicular to the VSIDE axis. More generally, for a printer system having a total of N simultaneously operating laser beams, the preferred number of pels in the screen dot direction that is perpendicular to the direction of the laser beam raster is equal to M * N where M and N are both integers.

Selecting the size of the supercell to match the size of the imaging hardware is desirable to reduce banding artifacts. When the VSIDE parameter of the supercell is equal to an integer multiple of the number of beams in the printer system, common portions of the screen dots are drawn with a common laser beam. Thus, for example, the first row of each supercell 300 depicted in FIG. 3 is drawn using the same laser beams (presumably laser beam number 1). In conventional designs, where the size of the supercell is not selected according to the number of laser beams, banding occurs. This frequently is referred to as halftone moire banding.

Figure 5:
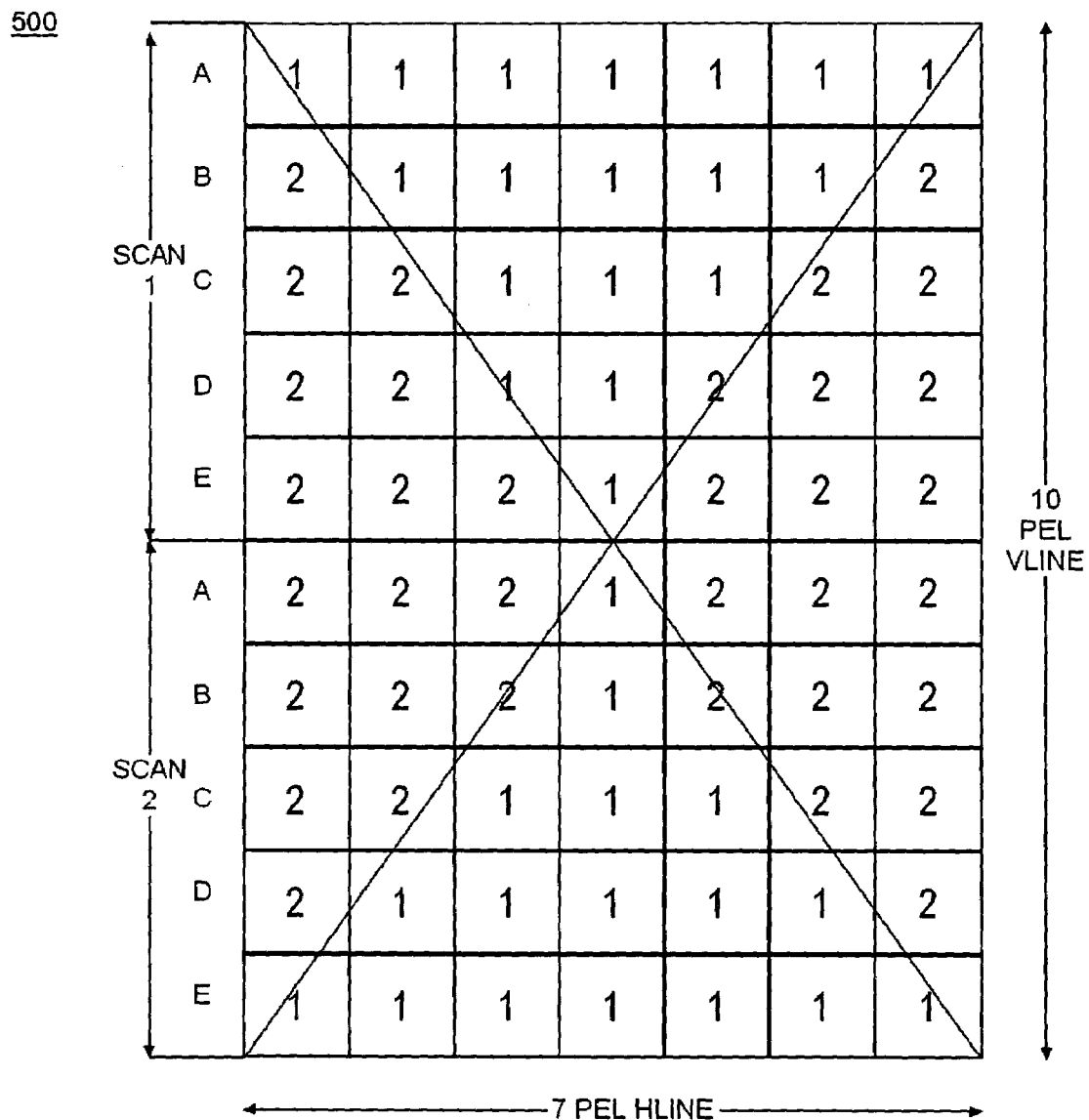
FIG. 5 is a representation of a screen dot for use in the presentation invention

Turning now to FIG. 5, a representative supercell design 500 according to the present invention is depicted. Supercell design 500 is a non-orthogonal design because the HSIDE and VSIDE parameters are not equal. FIG. 5 also illustrates which cells within the supercell 500 are assigned to the first screen dot and which cells are assigned to the second screen dot. In the depicted configuration, supercell 500 encompasses two screen dots using a 7×10 array of pels.

Each screen dot is tiled adjacent to its neighboring screen dot and tiled between adjacent rows of supercells without offset. FIG. 5 also indicates row assignments for each of the laser beams in a five beam printer system. Specifically, a laser beam "A" writes the first row of supercell 500, a second laser beam "B" writes the second row of supercell 500, and so forth. During a second raster pass of the laser beams, laser beams A through E write the lower portion of screen dot 2 and an upper portion of screen dot 1. Since the supercells are adjacent the adjacent screen dots will be printed in a similar fashion.

Referring now to FIG. 6 and FIG. 7, illustrations of tiled threshold arrays are presented to illustrate the snap function of the preferred embodiment. The snap function is desirable when the number of pels X along the raster direction is an odd number. Specifically, in the context of the depicted implementation, the snap function is necessary to accommodate the odd number of pels in the horizontal line. When a supercell, such as supercell 601 has an odd number of pels in the horizontal direction (for example), snapping becomes desirable to enable consistent screen dot growth. FIG. 6 illustrates the case of no-snap function. In the no-snap implementation, the odd number of screen dot pels in the horizontal direction causes the screen dots 601 and 602 to grow inconsistently, as is revealed in FIG. 6. In FIG. 6, inconsistent screen dot growth begins from the earliest values encountered in the threshold array (255, e.g.), as is illustrated by the comparison of the first four pels to be blackened in FIG. 6 and FIG. 7. The snap function is so desireable when the supercells has an odd number of pels in vertical direction.

Inconsistent screen dot growth leads to visible artifacts in the printed document, especially when the inconsistencies occur in the earliest pels (i.e., the first pels activated). FIG. 7, on the other hand, illustrates screen dot growth for the case of a spot function employing the snap function feature. The snap function forces pel raster data to shift to the nearest pel boundary. This produces a screen dot center which is moved a fraction of a pel. Snapping the screen dot results in perfectly uniform screen dot growth between the two screen dots for the earliest, highlight tone range, and visually most important pels. Although the spots grow differently for very low threshold values in the shadow tone range, these are generally much less objectionable to the human eye. The spot function is responsible for darkening pels in a supercell according to its priority data value producing a predetermined mapping.

Figure 9:
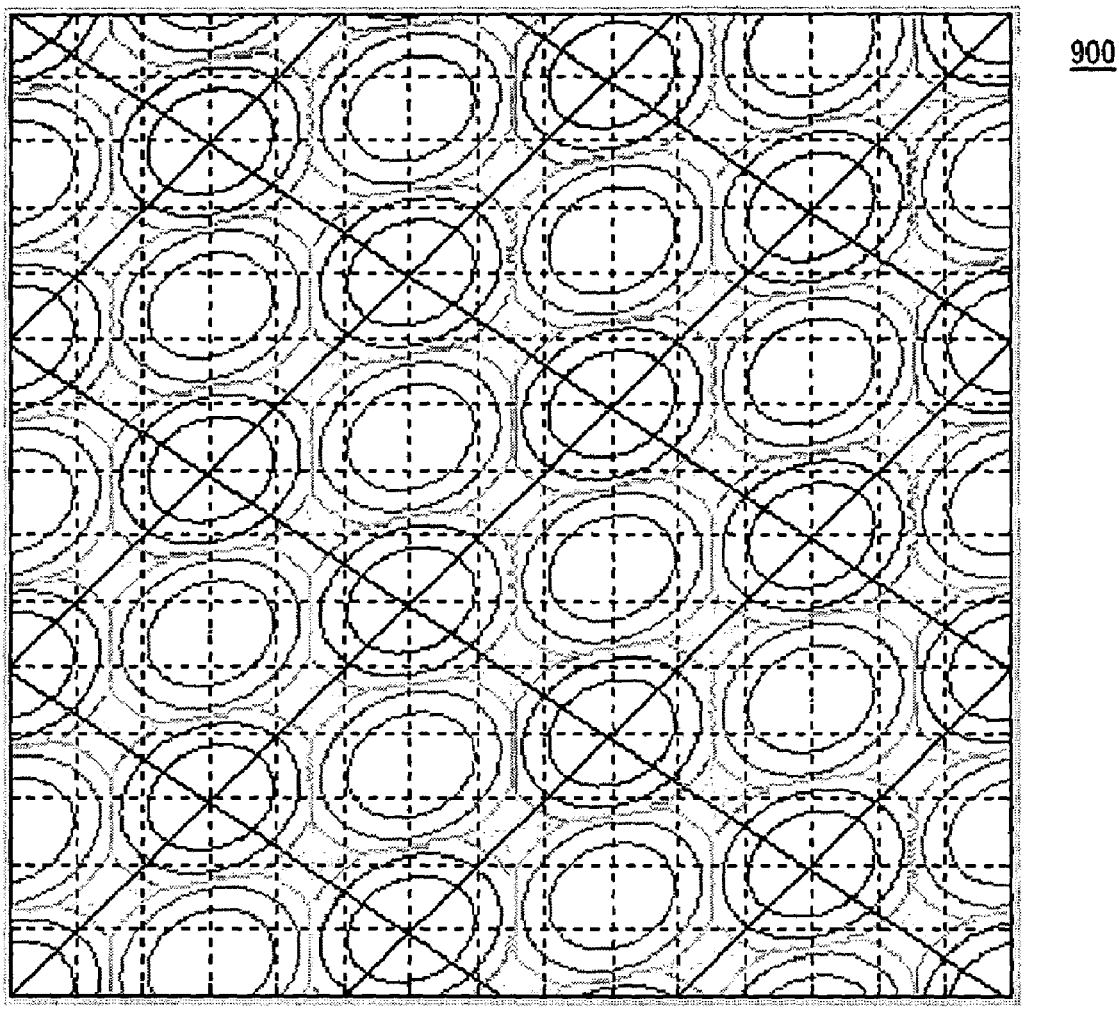
FIG. 9 shows the contour map of a tiling of non-orthogonal cells with the Euclidean spot function without distortion correction.
Figure 10:
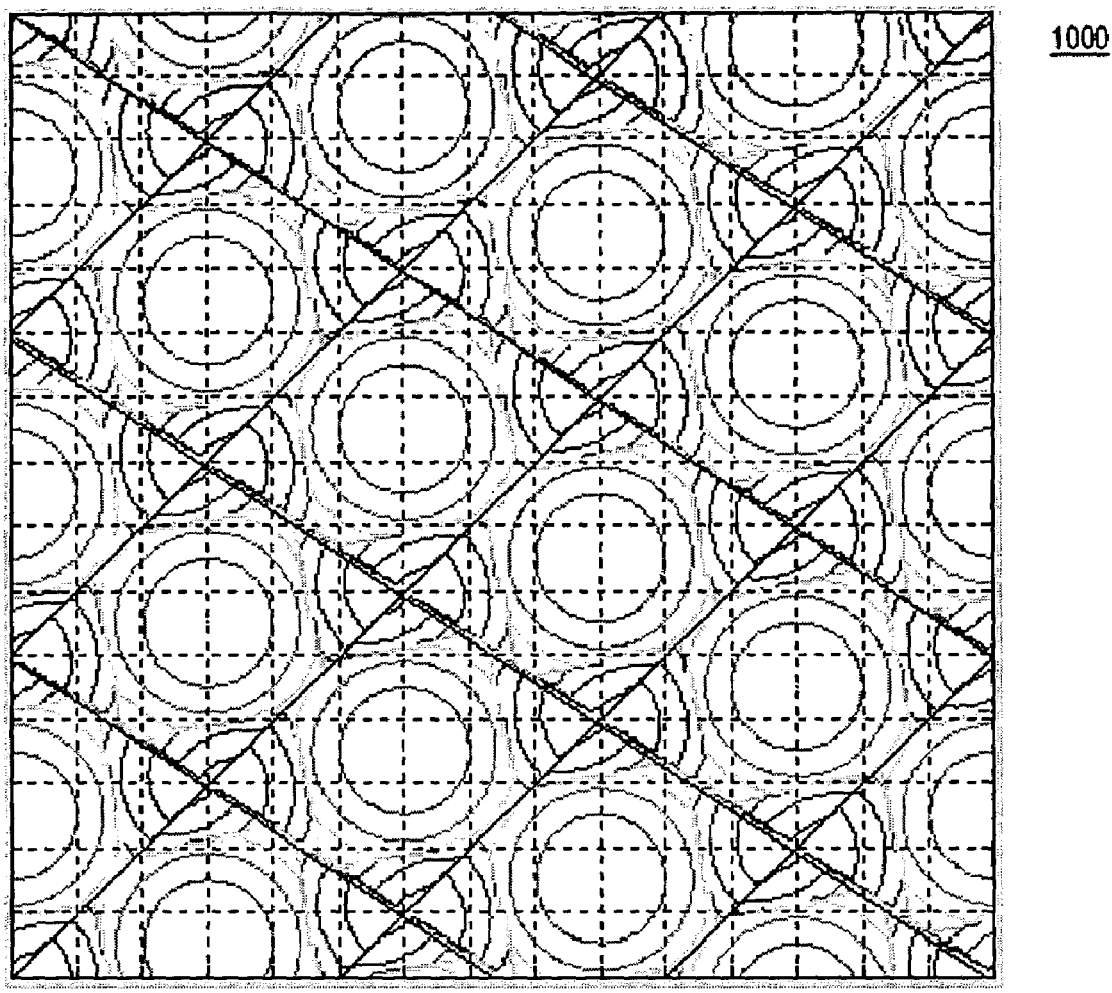
FIG. 10 shows the contour map of a tiling of non-orthogonal cells with the Euclidean spot function after scaling to compensate for distortion.

For non-orthogonal screen dots, the spot function is distorted due to the non-orthogonality. For instance, a Euclidean spot function generates circular dots for orthogonal screen cells, but generates elliptical dots for non-orthogonal screen dots. The contour map 900 of the Euclidean spot function for multiple tiled screen dots is shown in FIG. 9. To compensate for this distortion, in one implementation, a spot function is used to create the supercell 131 with the axis of the spot function aligned with only one of the screen directions. The preferred direction for this is along the direction of maximum ellipticity. The spot function is maintained with its axis orthogonal, but is scaled linearly in one axis directions. Applying this scaling to the spot function in the non-orthogonal screen dot compensates for the distortion caused by the warping of a spot function to the halftone cell. This is illustrated by the counter map 1000 FIG. 10, where the centers of the screen dots have circular contours. However, in this scaling method, the continuity with adjacent cells can be broken.

Figure 11:
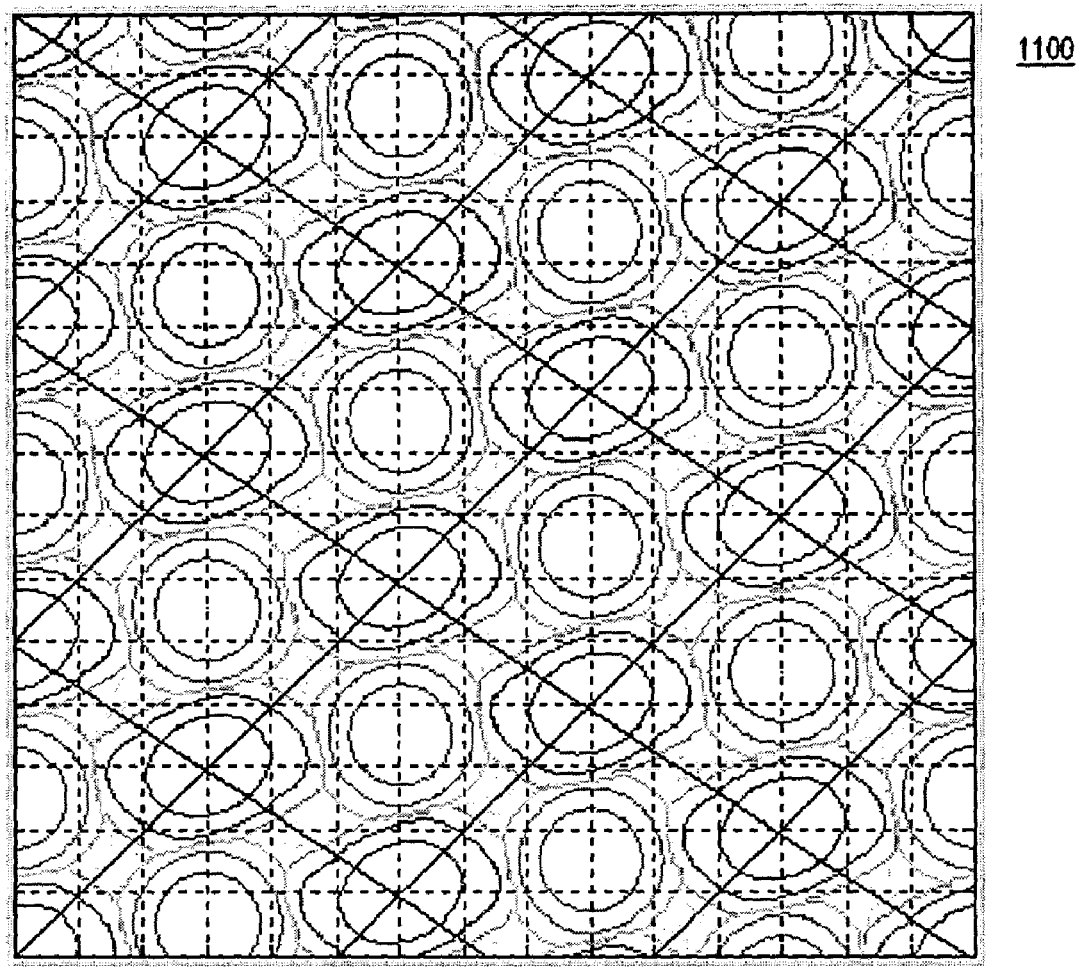
FIG. 11 shows the contour map of a tiling of non-orthogonal cells with the Euclidean spot function after scaling to compensate for distortion with the amount of scaling decreasing away from the center of the cell.

In another embodiment, the effect of the scaling is gradually reduced away from the center of the screen dot, with no scaling at the boundaries of the screen cells. This compensates for the distortion of the spot function near the center of the screen dot, and maintains continuity with adjacent cells, as illustrated by the contour map 1100 of FIG. 11.

Figure 8:
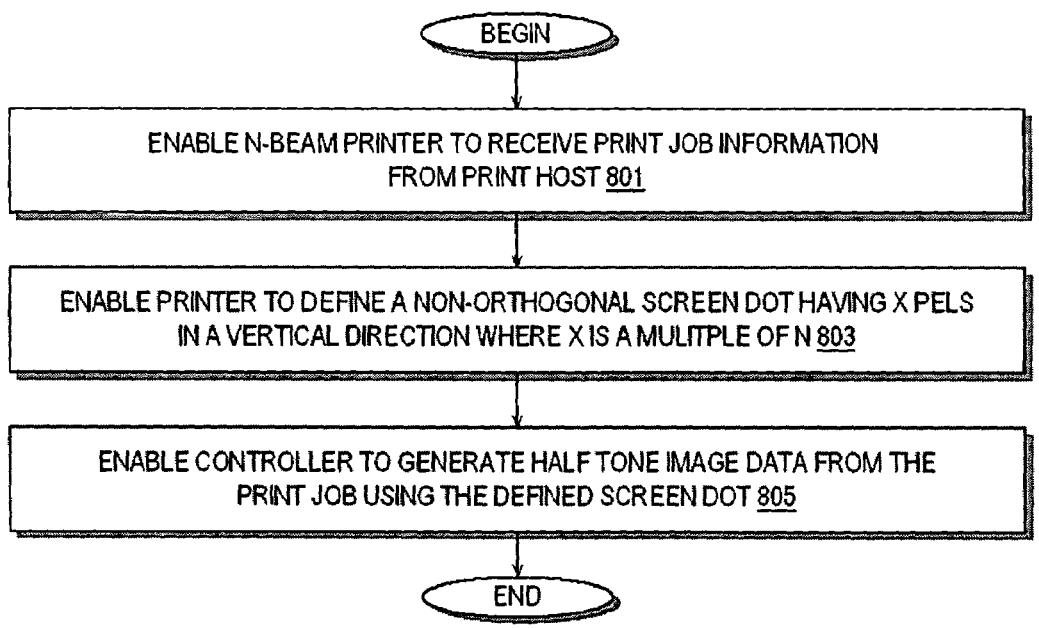
FIG. 8 depicts a service for enabling a printer to generate halftone image data free or substantially free of banding artifacts according to an embodiment of the invention.

In some embodiments, the invention is implemented as a service for configuring or otherwise enabling a high speed printer to generate substantially bandless halftone image data as described above. As depicted in FIG. 8, these embodiments include enabling (block 801) a multiple beam printer having N beams to receive print job information from a print host and enabling (block 803) the printer to define a non-orthogonal screen dot. The number of pels Y in the vertical direction (assuming a horizontal raster) is an integer multiple of the number of beams N. The service further includes enabling (block 805) the controller to generated halftone image data from the print job information using the defined screen dot.

It will be apparent to those skilled in the art having the benefit of this disclosure that the present invention describes a system and method for reducing banding artifacts in a multiple beam laser printer system. It is understood that the form of the invention shown and described in the detailed description and the drawings are to be taken merely as presently preferred examples.

It is intended that the following claims be interpreted broadly to embrace all the variations of the preferred embodiments disclosed.

What is claimed is:

1. A printer system, comprising:
   imaging hardware including multiple laser beams configured to write N lines of a printed document simultaneously; and
   a rendering application using a threshold array to generate halftone image data wherein the threshold array is non-orthogonal and further wherein the threshold array includes Y pels in a direction that is perpendicular to the writing direction of the laser beams and wherein Y is an integer multiple of N.

2. The system of claim 1, wherein the threshold array is further defined by a spot function which generates the halftone image data, wherein the spot function snaps a screen dot to the nearest pel in a printer grid.

3. The system of claim 1, and further wherein the print job information is formatted according to a format selected from the group of formats consisting of Intelligent Printer Data Stream (IPDS), Postscript and printer control language (PCL).

4. The system of claim 1, wherein a distance between adjacent screen dots in pels, measured perpendicularly to the writing direction of the laser beams, is equal to an integer multiple of N.

5. The system of claim 1, wherein the threshold array defines a supercell encompassing two screen dots and having an odd number of pels in a direction that is parallel to the writing direction of the laser beams.

6. The system of claim 1, wherein the threshold array is further defined by a spot function that generates the halftone image data, wherein the spot function used to generate the threshold array is scaled along one axis of the screen.

7. The system of claim 6, wherein the direction of scaling in the spot function is the direction of greater ellipticity.

8. The system of claim 7, wherein the amount of scaling decreases away from a center of the screen dot.

9. A computer program product comprising computer executable instructions, stored on a computer readable medium, for generating halftone image data for reproduction on a multiple beam printer system having N laser beams, the instructions comprnsing:
   instructions for receiving, by a controller, print job information from a print host; and
   instructions for using a threshold array based on a defined screen dot to generate the halftone image data wherein the threshold array is non-orthogonal and further wherein the threshold array includes Y pels in a direction that is perpendicular to a writing direction of the laser beams and wherein Y is an integer multiple of N.

10. The computer program product of claim 9, wherein the threshold array is further defined by a spot function for generating the halftone image data, wherein the spot function snaps a screen dot to their nearest pel in a printer grid.

11. The computer program product of claim 9, wherein the print job information is formatted according to a format selected from the group of formats consisting of Intelligent Printer Data Stream (IPDS), Postscript and printer control language (PCL).

12. The computer program product of claim 9, wherein a distance between adjacent screen dots in pels, measured perpendicularly to the writing direction of the laser beams, is equal to an integer multiple of N.

13. The computer program product of claim 9, wherein the threshold array defines a supercell encompassing two screen dots and having an odd number of pels in a direction that is parallel to the writing direction of the laser beams.

14. The computer program product of claim 11, further comprising instructions for accessing a spot function to generate the halftone image data, wherein the spot function used to generate the threshold array is scaled along one axis of the screen.

15. The computer program product of claim 13, wherein the direction of scaling in the spot function is the direction of greater ellipticity.

16. The computer program produce of claim 14, wherein the amount of scaling decreases away from a center of the screen dot.

17. A service for a multiple beam printer system having N laser beams to generate halftone image data comprising
   a controller of the printer system receiving print job information from a print host;
   the printer system using a threshold array based on a defined screen dot to generate the halftone image data wherein the threshold away is non-orthogonal and further wherein the threshold array includes Y pels in a direction that is perpendicular to a writing direction of the laser beams and wherein Y is an integer multiple of N; and the controller generating the halftone image data from the print job information, wherein the halftone image data comprises a plurality of the defined screen dots.

18. The service of claim 17, wherein the threshold array is further defined by a spot function for generating the halftone image data, wherein the spot function snaps a screen dot to their nearest pel in a printer grid.

19. The service of claim 17, wherein a distance between adjacent screen dots in pels, measured perpendicularly to the writing direction of the laser beams, is equal to an integer multiple of N.

20. The service of claim 17, wherein the threshold array defines a supercell encompassing two screen dots and having an odd number of pels in a direction that is parallel to the writing direction of the laser beams.

* * * * *